United States Patent [19]

Warburton

[11] Patent Number: 5,114,651
[45] Date of Patent: May 19, 1992

[54] METHOD OF FORMING AN ORIFICE IN A STRUCTURE DURING MOLDING THEREOF

[75] Inventor: Richard T. Warburton, Canandaigua, N.Y.

[73] Assignee: Mobil Oil Corporation, Fairfax, Va.

[21] Appl. No.: 666,982

[22] Filed: Mar. 11, 1991

Related U.S. Application Data

[62] Division of Ser. No. 451,905, Dec. 18, 1989, Pat. No. 5,032,106.

[51] Int. Cl.$^5$ .............................................. B29C 51/26
[52] U.S. Cl. .................................. 264/156; 264/155; 264/163; 425/292
[58] Field of Search .............................. 264/154–156, 264/163, 320; 425/290, 292, 296, 297, 298, 299, 300, 302.1, 305.1, 398

[56] References Cited

U.S. PATENT DOCUMENTS

| | | | |
|---|---|---|---|
| 1,449,385 | 5/1923 | Dieterich | 72/326 |
| 3,290,418 | 12/1966 | Best | 264/553 |
| 3,845,187 | 10/1974 | Dahlberg | 264/154 |
| 3,862,817 | 1/1975 | Dahlberg | 425/292 |
| 4,142,848 | 3/1979 | Irwin | 425/298 |
| 4,155,692 | 5/1979 | Kermoian | 425/292 |
| 4,304,747 | 12/1981 | Lake | 264/156 |
| 4,446,088 | 5/1984 | Daines | 264/155 |
| 4,612,153 | 9/1986 | Mangla | 264/154 |
| 4,909,721 | 3/1990 | Warburton | 425/289 |

FOREIGN PATENT DOCUMENTS 1127326 6/1986 Japan.
1054075 11/1983 U.S.S.R..

*Primary Examiner*—James C. Housel
*Attorney, Agent, or Firm*—Alexander J. McKillop; Charles J. Speciale; Michael J. Mlotkowski

[57] ABSTRACT

A pair of male and female mold parts in association with a closure for forming orifices during the thermal formation of a structure. The combination includes: a pair of mold members having a first mold member and a second mold member; at least one male key member carried by the first mold member having on at least one side thereof a planar face terminating in either a cutting edge or a bevelled face; at least one female key member carried by the second mold member having a pair of spaced planar faces each terminating in either a cutting edge or a bevelled face; wherein at least one of the key members is free to move independently of its mold member, the key members being dimensioned, constructed and registered so that a cutting edge of one key member will be opposite to a bevelled face of the other key member so that, on closure of the mold members with a softened sheet of plastic therebetween, the cutting edge of one key member will contact the sheet, ride off the bevelled face, the planar faces will come into alignment and, with a sliding relationship between the planar faces, the male key will cooperate with the female key to form the orifice.

7 Claims, 6 Drawing Sheets

METHOD OF FORMING AN ORIFICE IN A STRUCTURE DURING MOLDING THEREOF

This is a division of copending application Ser. No. 451,905, filed on Dec. 18, 1989, now U.S. Pat. No. 5,032,106.

FIELD OF THE INVENTION

The present invention relates to a method for forming an orifice in a moldable structure during the shape molding thereof and to an apparatus for accomplishing the same.

BACKGROUND OF THE INVENTION

Beginning in the 1960's, foamed thermoplastic containers began to compete with containers traditionally made of paper pulp or comparatively dense organic plastic materials. U.S. Pat. Nos. 3,845,187 and 3,862,817, the disclosures of which are incorporated herein by reference in their entirety, are concerned with the thermoplastic molding of containers such as egg cartons and the like.

U.S. Pat. No. 3,845,187 emphasizes at col. 1, lines 64-66, the disadvantages involved in the then-current technique of first molding a container and in a second downstream operation employing hole-punching equipment to form latch openings in the container. U.S. Pat. No. 3,845,187 discloses at a col. 1, lines 66-70 "a way of forming the desired latch opening during the molding process itself with a relatively simple and workable variation in the mold to eliminate the entire hole-punching accessory and the problem it causes."

The aforementioned patents teach that latch hole openings can be formed in the top front cover of egg cartons during the process of molding the container. They teach that moldable plastic is shape molded by forming a compression between a pair of cooperating mold members; and, during this molding, key members cooperate with a combination of a bevel and oblique surfaces to first pierce the plastic, and second, continuation of relative motion between the key members, enlarges the regions pierced to create the needed orifices by scraping and tearing the side edges. These orifices then serve as latch openings. They cooperate with a lower flap member and together form a secure latching arrangement which can keep the container structure closed.

Automatic thermoformation equipment designed to form a plurality of structures simultaneously are normally massive pieces of equipment which are expected to continuously operate up to three work shifts per day, seven days a week. This equipment utilizes male and female mold members which define the thermoformed structures. Each half of the mold is a dense machined tool member which must stand up to repetitive thermoformation operations which not only involve physical force but rapid and wide changes in temperature. Failure of even the smallest component of the mold structures will cause a shutdown of the thermoformation apparatus.

One cause of system shutdown involves the key members utilized in the mold members to form orifices in the containers. In order to extend the life of such key members, the mold member can be made to provide precise key member registration or, alternatively, at least one of the key members can be made to yield in a direction transverse to the closure of the molds in order to avoid destruction or early wear-related failure. In the latter case, these key members are usually spring biased so that this transverse motion can be permitted with return of the key member to its proper location after the transverse motion is completed. It has been suggested to either place a resilient member or a spring member behind one or the other of the key members so that during mold closures any misalignment of the key member will not lead to early self-destruction. These spring or elastic means have not always served the purpose for a reasonable period of time. Failure of the resilient or spring member leads to failure of the key members soon thereafter, or inadequate formation of latch holes.

Therefore, it is an object of the present invention to improve the reliability of the members employed to form the desired orifices in plastic parts.

SUMMARY OF THE INVENTION

The present invention is concerned with a pair of mold members in association with closure means for forming an orifice during the thermoformation of a container structure. The combination includes: a pair of mold members having a first mold member and a second mold member: at least one male key member carried by the first mold member having on at least one side thereof a planar face terminating in either a cutting edge or a bevelled face; at least one female key member carried by the second mold member having a pair of spaced planar faces each terminating in either a cutting edge or a bevelled face; wherein at least one of the key members is free to move independently of its mold member, the key members being dimensioned, constructed and registered so that a cutting edge of one key member will be opposite to a bevelled face of the other key member so that, on closure of the mold members with a softened sheet of plastic therebetween, the cutting edge of one key member will contact the sheet, ride off the bevelled face, the planar faces will come into alignment and, with a sliding relationship between the planar faces, the male key will cooperate with the female key to form the orifice.

The present invention is also concerned with the process of creating an orifice in a plastic part during the shape molding thereof. In an earlier filed application by the inventor, U.S. Ser. No. 311,809, filed on Feb. 16, 1989, orifices were formed during thermoformation of plastic parts by employing a non-fixed key apparatus and technique wherein the orifice-forming keys were not spring loaded or resiliently loaded. As pointed out in Ser. No. 311,809, where one orifice cutting key member is fixed and the other is free to move in relation to the mold half in which it is mounted, it is important that the free to move key be returnable to its original position occupied just prior to closure so that it will always be properly positioned and ready to form the next orifice during the next molding cycle. It was taught that this movable key would return to its original position either by the force of gravity or by hydraulically or pneumatically transmitted forces which act on the movable key to return it to its original position.

As will be seen, with regard to the present invention, because one or both of the orifice-forming key members are free to move and because of their particular configuration, they are always brought into perfect orifice-forming alignment, automatically, during the mold closure operation.

DETAILED DESCRIPTION OF THE PRESENT INVENTION

Figure 1:
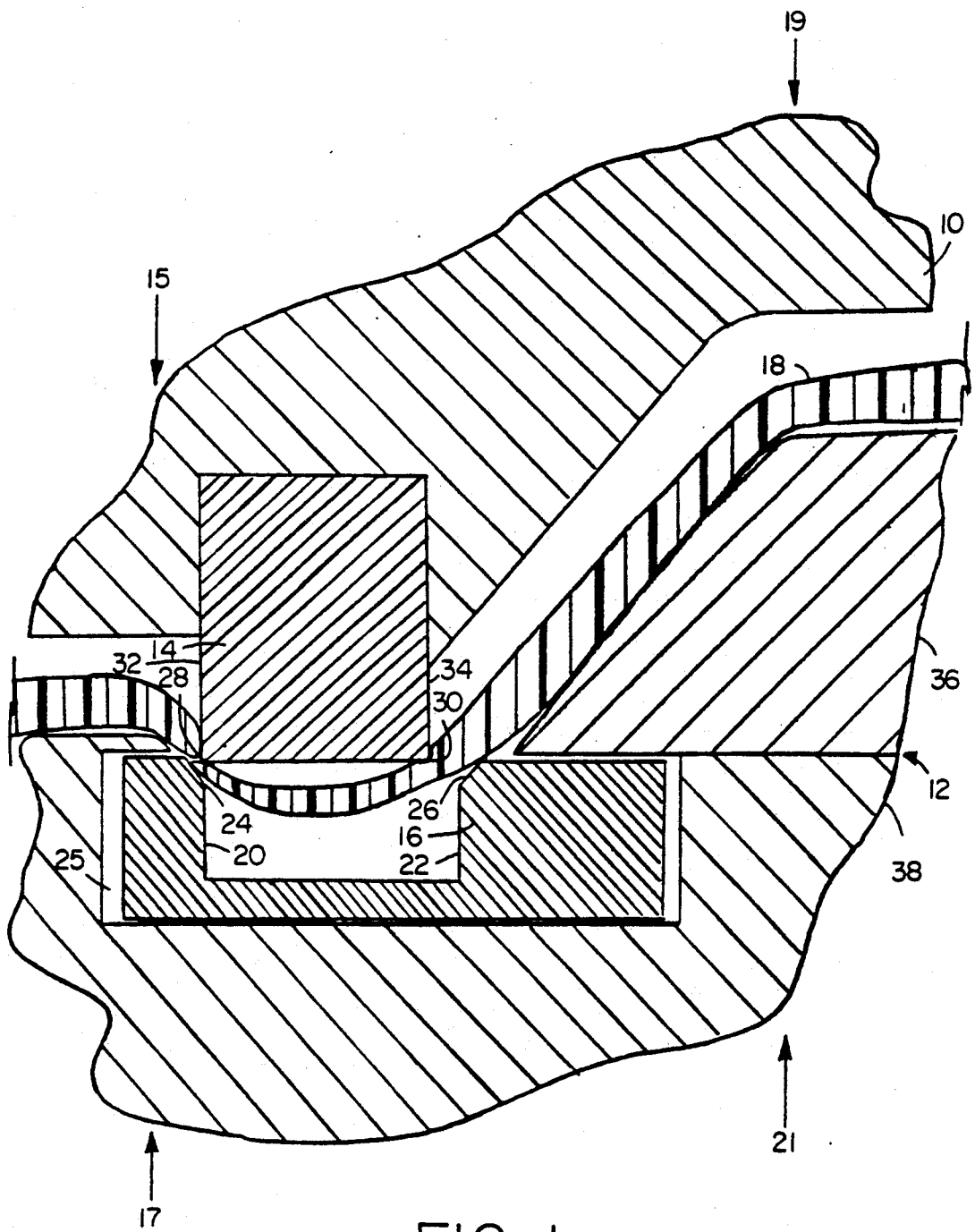
FIG. 1 is a side elevational view in cross-section of a fragment of a pair of mold members positioned roughly mid-way through a molding sequence.

The present invention is best understood by reference to the appended FIGS., which are given by way of example and not of limitation. Referring now to FIG. 1, a side elevational view in cross-section of a fragment of a pair of mold members according to the present invention is shown positioned roughly mid-way through a molding sequence. FIG. 1 illustrates the component parts of the mold pair which, during the molding of a heat softened plastic sheet, would simultaneously, with the shape molding of the plastic, form an orifice therein. As those skilled in the art will plainly understand, although reference will be made to the mold members shown in the drawings as "top" or "bottom", it is to be recognized that the top and bottom mold members may be reversed and therefore it is only their relative position that is important. Moreover, the location of the specific key members of the drawings as being in the top or bottom mold member is for illustration only. As can be envisioned, the relative locations of the key members can be reversed and still function in the same desirable manner.

FIG. 1 shows top mold member 10 spaced apart from bottom mold member assembly 12. These members are shown roughly mid-way through a molding operation in which a heat softened sheet of thermoplastic material 18 is being shape formed. Although the fragmentary mold members shown are designed for use in the shape molding of fast food sandwich containers, a wide variety of structures are clearly benefitted by the practice of the present invention. Carried by top mold member 10 is a male key member 14, shown having two cutting edges 28 and 30 in association with substantially flat, planar faces 32 and 34, respectively. While cutting edges 28 and 30 are shown having 90° corner edges, cutting edges having acute angles of less than 90° will perform adequately, so long as the angle is selected consistent with durability and long term use in mind. As those skilled in the art will recognize, should only a single orifice be required in the structure to be thermoformed, edge 28 or 30 may be terminated in a bevel to avoid the shearing of material at that location. Male key member 14, as shown in FIG. 1, is configured to form a "belt-buckle-type" latching mechanism in the thermoplastic material 18 undergoing thermoformation. Female key member 16 is held in position in chamber 25 which is machined out of bottom mold member component 38 of bottom mold member assembly 12. As shown, female key member 16 is held in position by bottom mold member component 36, so as to be freely movable within chamber 25. Female key member 16 is shown to have a pair of spaced planar faces 20 and 22, each terminating in bevelled faces 24 and 26.

As mentioned, a common cause of shutdown in shape molding thermoforming operations involves the key members and the need to either have good registration of the key members or to have at least one key member capable of yielding in a direction transverse to the direction of mold closure. It may be seen by reference to FIG. 1 that the present invention is directed to the use of transverse key motion and provides for that movement in a novel way. As indicated by directional arrows 15, 17, 19 and 21, mold closure is effected in the vertical direction, while cavity 25 permits female key member 16 to yield in a direction transverse to the direction of mold closure. What is particularly desirable from the standpoint of reduced operation downtime is that the particular configuration shown in FIG. 1, provides proper alignment of the key members in a most simple and effective manner, as will be described in more detail hereinafter.

Referring to FIG. 1, as top mold member 10 and bottom mold member assembly 12 move toward each other to shape form thermoplastic material 18, at least one cutting edge 28 or 30 of male key member 14, will initially contact at least one bevelled face 24 or 26 of female key member 16. As can be envisioned, whether cutting edge 28 first strikes bevelled face 24 or cutting edge 30 first strikes bevelled face 26 or both cutting edges 28 and 30 contact bevelled faces 24 and 36 simultaneously, will depend upon where female key member 16 was positioned following the opening of the mold members after the shape forming of the previous part, since the female key member is free to move transversely within cavity 25. What is particularly advantageous is that whichever cutting edge comes in contact first with female key member 16, such initial contact will necessarily induce translational movement of female key member 16, thus providing the necessary registration of male key member 14 with female key member 16 to effect the desired orifice formation in thermoplastic material 18. As can be envisioned, as top mold member 10 and bottom mold member assembly 12 continue to approach each other, cutting edges 28 and 30 will ride off bevelled faces 24 and 26, and, in so doing, pierce through softened thermoplastic material 18, creating the desired orifices. As the mold members move still closer together, planar faces 20 and 22 will slidingly engage planar faces 32 and 34 of male key member 14, so as to form the edges of the orifices by stretching the plastic after the initial contact of cutting edges 28 and 30 wit bevelled faces 24 and 26. Thereafter, upon closure of top mold member 10 and bottom mold member assembly 12, full expansion of the orifices in the molded plastic will be obtained. Separation of top mold member 10 and bottom mold member assembly 12 to their initial, fully open position permits removal of the molded article now containing the two orifices which together form the belt-buckle-like latch, previously described. Upon opening, female key member 16 is free to move to any position within cavity 25. Planar faces 28 and 30 and faces 32 and 34 are machined or otherwise formed so that when in parallel contacting relationship with their respective surfaces they can readily slide across one another. One skilled in the art can easily determine the tolerances necessary to permit the required degree of freedom of female key member 14 within cavity 25 of bottom mold member component 38 of bottom mold member assembly 12. As can be seen, one constraint on translational movement permitted female key member 16 and the relative dimensioning of bevelled faces 24 and 26 of female key member 16 is the requirement that initial contact of a cutting edge 28 or 30 of male key member 14 be with a bevelled face 24 or 26 and not an adjacent horizontal surface of female key member 16. Such contact with a horizontal surface will not provide the necessary registration of the key members required to produce an orifice in the manner herein disclosed.

It is within the skill of the art to determine the optimum angle for the bevelled faces. Knowing that the object o the disclosed operation is to permit cutting edges 28 and 30 to glance off bevelled faces 24 and 26, it can readily be appreciated that this can best be accomplished when the bevel is less than some critical angle, for example, 45° or less. Angles greater than this may induce unwanted wear and interference. Moreover, as those skilled in the art will appreciate, the bevel angle may also be adjusted to produce an orifice having a particularly desired shape.

Figure 2A:
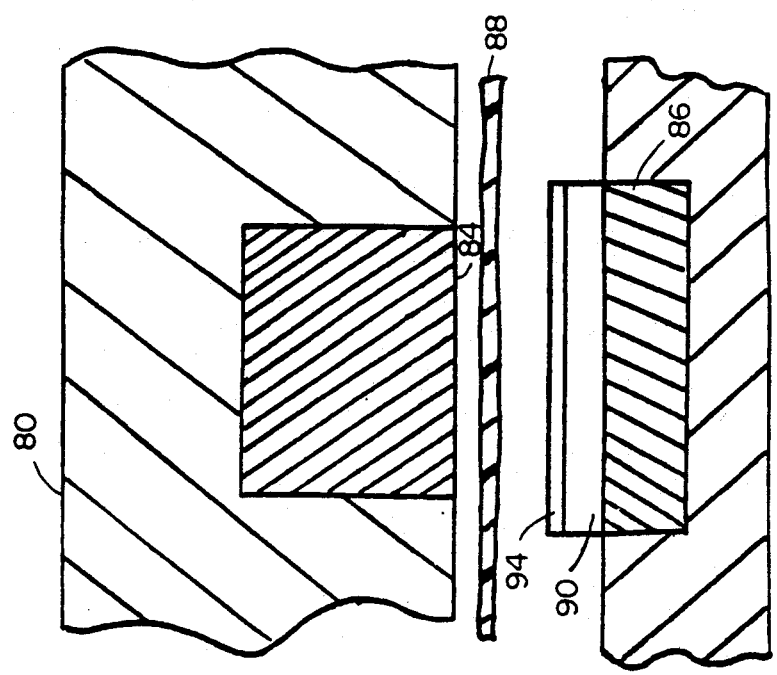
FIG. 2A is a section on line A-A of the fragment of mold members depicted in FIG. 2.
Figure 2:
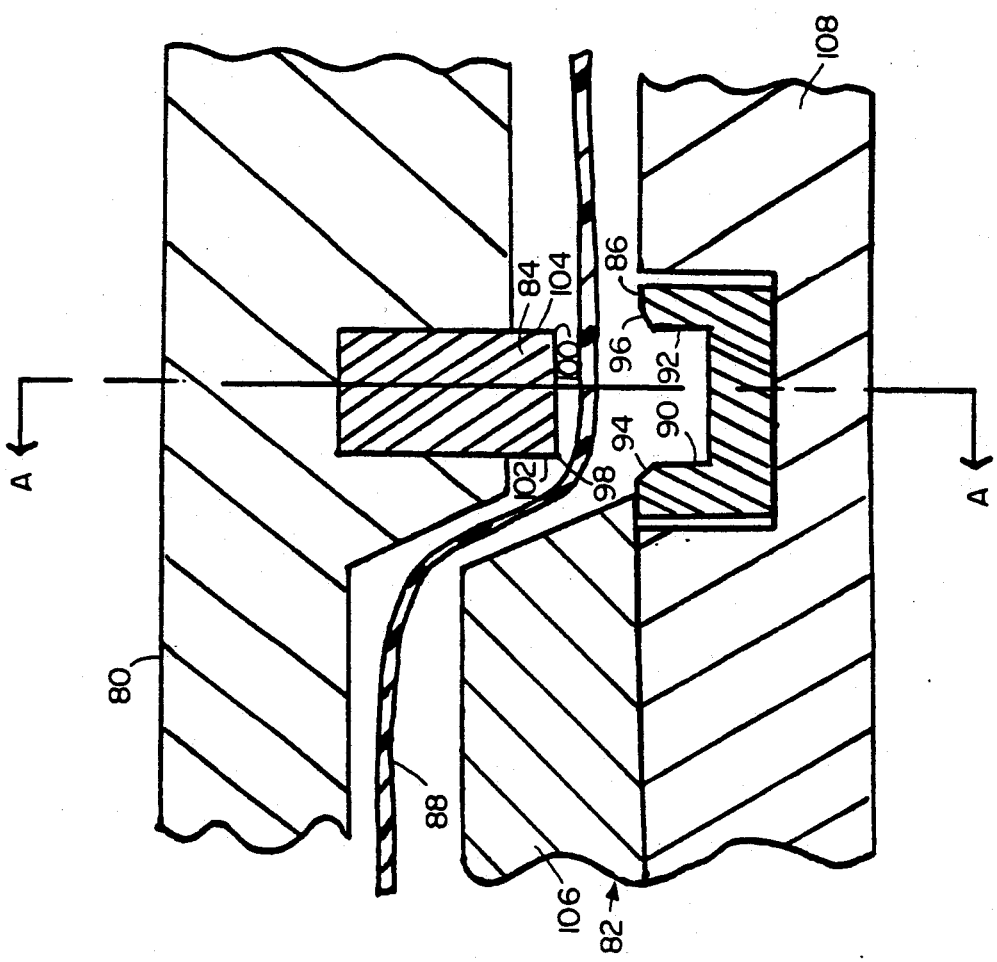
FIG. 2 shows a variation, in cross-section, of the mold arrangement of FIG. 1. The pair of mold members are show positioned near the beginning of a molding sequence.

A variation of the configuration of FIG. 1 is shown in FIG. 2. Once again, a belt buckle-type latch comprising two spaced apart orifices in which a tab member is to be inserted within, is to be formed by the structure depicted in FIG. 2. This time, however, the latch is formed on a horizontal plane, rather than on an angular surface. As shown, male key member 84 is fixed within top mold member 80 and has substantially flat surfaces 102 and 104 and cutting edges 98 and 100. Female key member 86 is located within cavity 105 of bottom mold member component 108 of bottom mold member assembly 82. Female key member 86 is configured to have a pair of spaced planar faces 90 and 92 which terminate in bevelled faces 94 and 96, respectively. As may be seen, female key member 86 is restricted to translational movement by bottom mold member component 106, that member effective to limit the vertical movement of female key member 86. FIG. 2A is a section on line A-A of the fragment of mold members depicted in FIG. 2, showing additional details.

Figure 3:
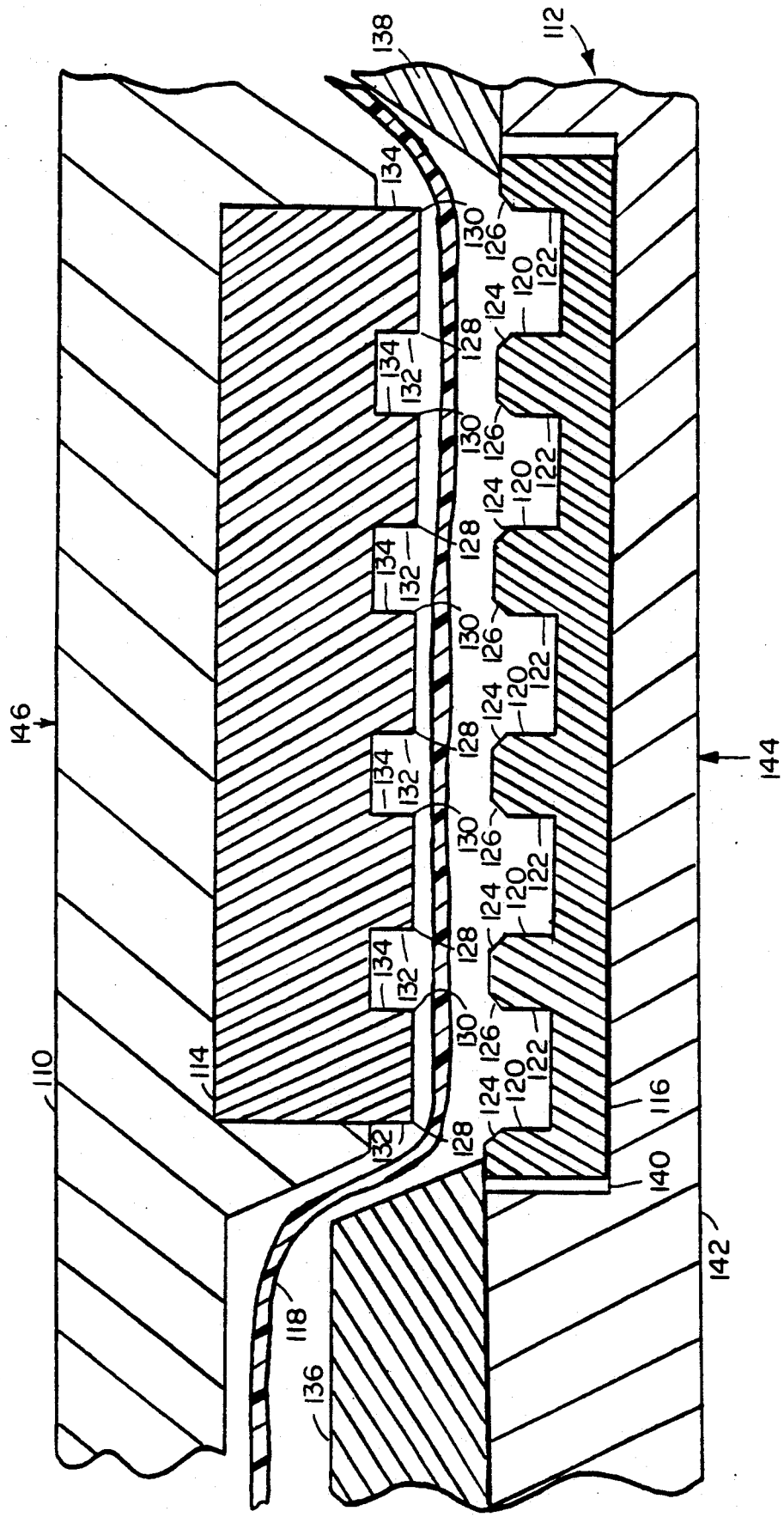
FIG. 3 is a side elevational view in cross-section of a fragment of a pair of mold members for use in forming a perforated cover-like element. The pair of mold members are positioned near the beginning of a molding sequence.

FIG. 3 depicts another variation of the present invention, this one directed to the formation of multiple orifices for the purpose of providing vent holes or the like within a thermoformed structure. The particular mold pair shown in FIG. 3 would find utility in the formation of a vented cove for use as a berry basket cover or the like. Such an arrangement could also be utilized to form a vented basket or container, as those skilled in the art will readily recognize. As shown, male key member 114 is fixed within top mold member 110. Male key member 114 has a plurality of cutting edges 128 and 130 spaced along its length and associated with substantially flat surfaces 132 and 134, respectively. Female key member 116 resides within cavity 140 of bottom mold member component 142 of bottom mold member assembly 112. Female key member 116 has a plurality of spaced planar faces 120 and 122 which are shown terminating in bevelled faces 124 and 126 respectively. As may be envisioned and, consistent with the previously described structures of the present invention, female key member 116 is free to yield in the transverse direction within cavity 140 and is precluded from vertical motion by the restraint imparted by bottom mold member components 136 and 138.

Figure 4:
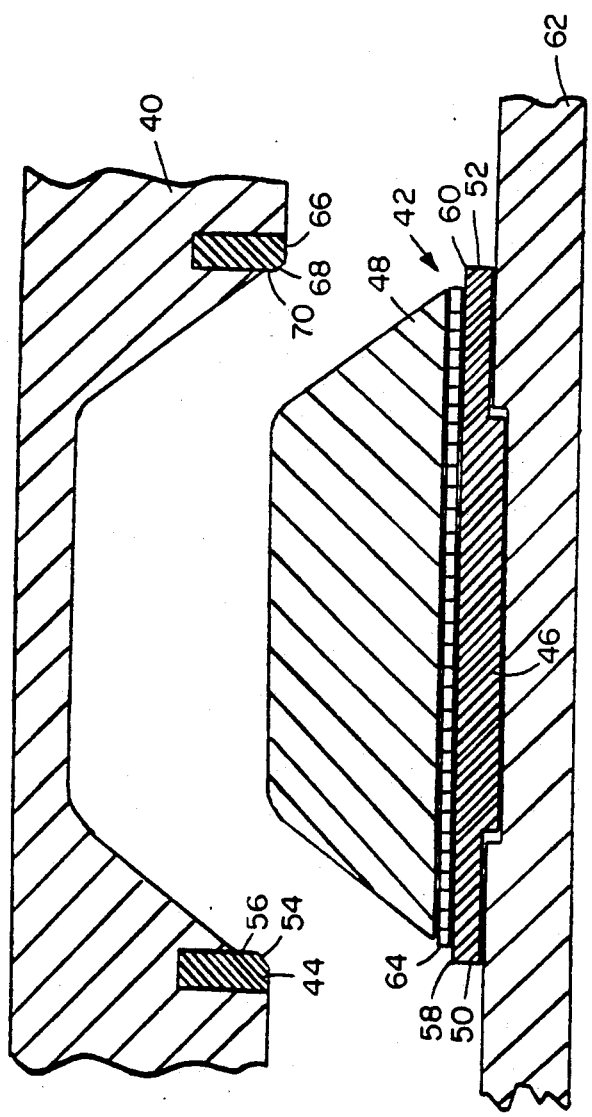
FIG. 4 is a side elevational view in cross-section of a fragment of a pair of mold members for use in forming a sandwich-type container having dual latches for employment with a lift-off cover. The pair of mold members are positioned near the beginning of a molding sequence.
Figure 4A:
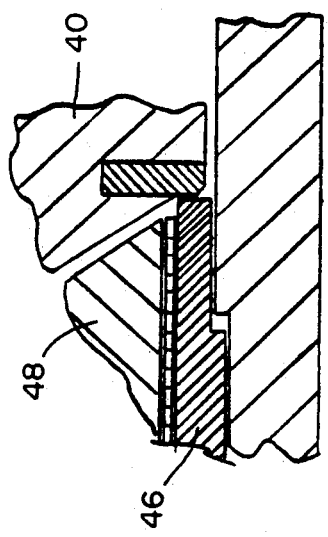
FIG. 4A is a partial side view in cross-section of a fragment of the pair of mold members depicted in FIG. 4. The pair of mold members are positioned near the end of a molding sequence.
Figure 5:
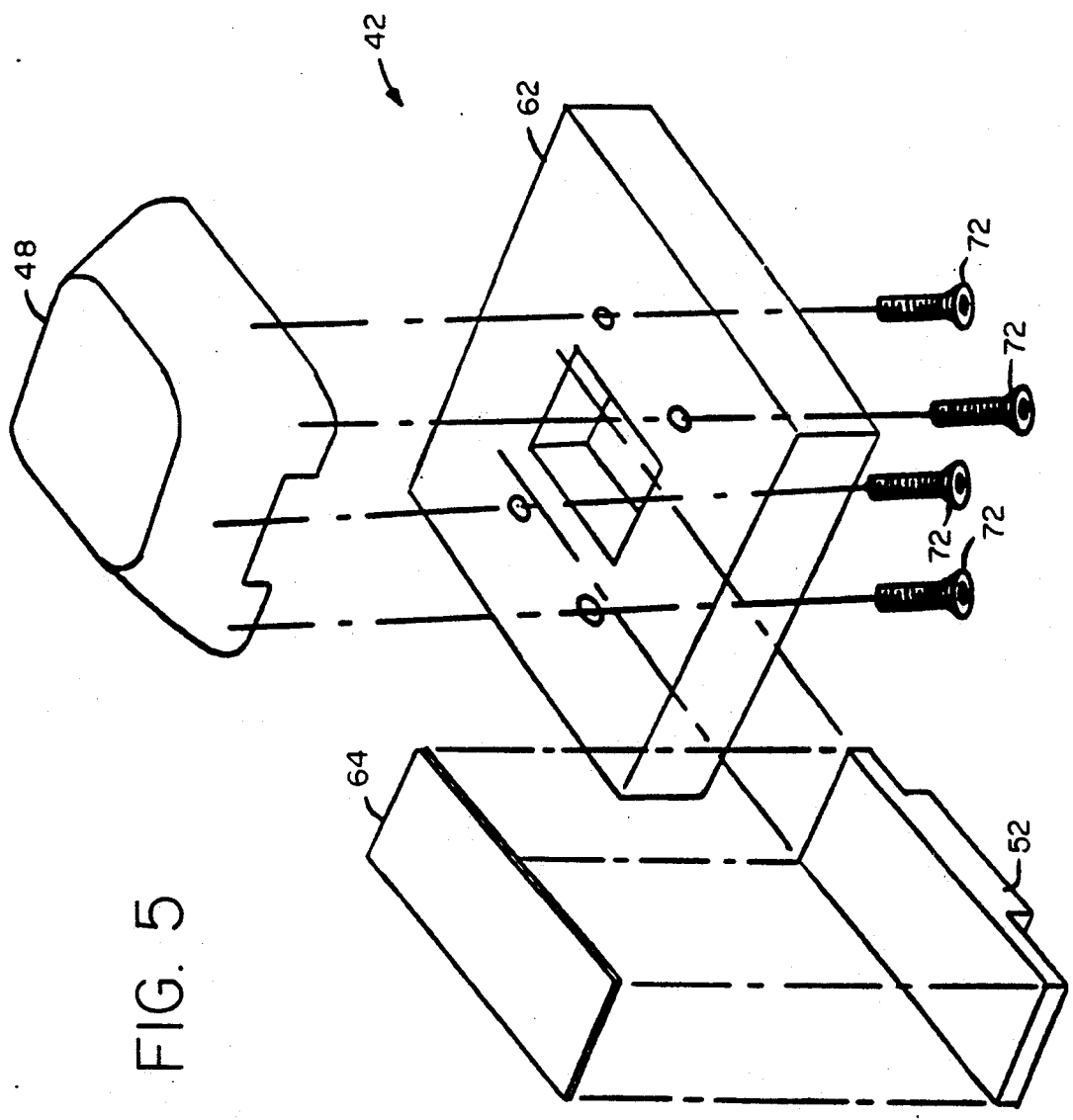
FIG. 5 is an exploded view of the lower member of the pair of mold members for use in forming a sandwich-type containe having dual latches for employment with a lift-off cover.

Another variation within the scope of the present invention is depicted in FIG. 4. FIG. 4 shows a side elevational view, in cross-section, of a fragment of a pair of mold members, top mold member 40 and bottom mold member assembly 42. The pair of mold members depicted in FIG. 4 are designed for forming a sandwich-type container having dual latches for employment with a lift-off cover. The pair of mold members are shown positioned near the beginning of a molding sequence (softened thermoplastic sheet material not shown), with the direction of movement of the mold members again being in the vertical direction for purposes of illustration. As shown, female key members 44 and 66 are fixed within top mold member 40. In this configuration, each female key member 44 and 66 has a substantially flat surface 56 and 70, respectively, which terminates in a bevelled face 54 and 68, respectively. Male key member 46, which resides within cavity 45 of bottom mold member component 62 is configured to have a pair of spaced planar faces 50 and 52 which terminate in cutting edges 58 and 60, respectively. As may be seen, male key member 46 is restricted to translational movement by bottom mold member component 48 which, as shown in FIG. 5 is bolted using bolts 72 to form bottom mold member assembly 42. To minimize frictional forces and provide for the free translational movement of male key member 46, bearing 64 can be provided. Bearing 64 may be constructed from a variety of materials capable of providing a friction reducing surface which can withstand the temperatures and pressures inherent in the thermoforming of the types of articles encompassed by the present invention. Teflon is an example of a suitable material for use in bearing 64. FIG. 4A is a partial side view in cross-section of a fragment of the pair of mold members 40 and 42 depicted in FIG. 4. The top mold member 40 and bottom mold member assembly 42 are positioned near the end of a molding sequence As may be envisioned, consistent with the other variations of the present invention described above, the key members 44, 46 and 66 are dimensioned, constructed and registered so that a cutting edge of one key member will be opposite to a bevelled face of the corresponding key member so that, on closure of the mold members with a softened sheet of plastic therebetween, the cutting edge will contact the sheet, ride off the bevelled face, the planar face will come into alignment and, with a sliding relationship between the planar faces, the male key member will cooperate with the female key member, forming the pair of orifices.

Figure 6:
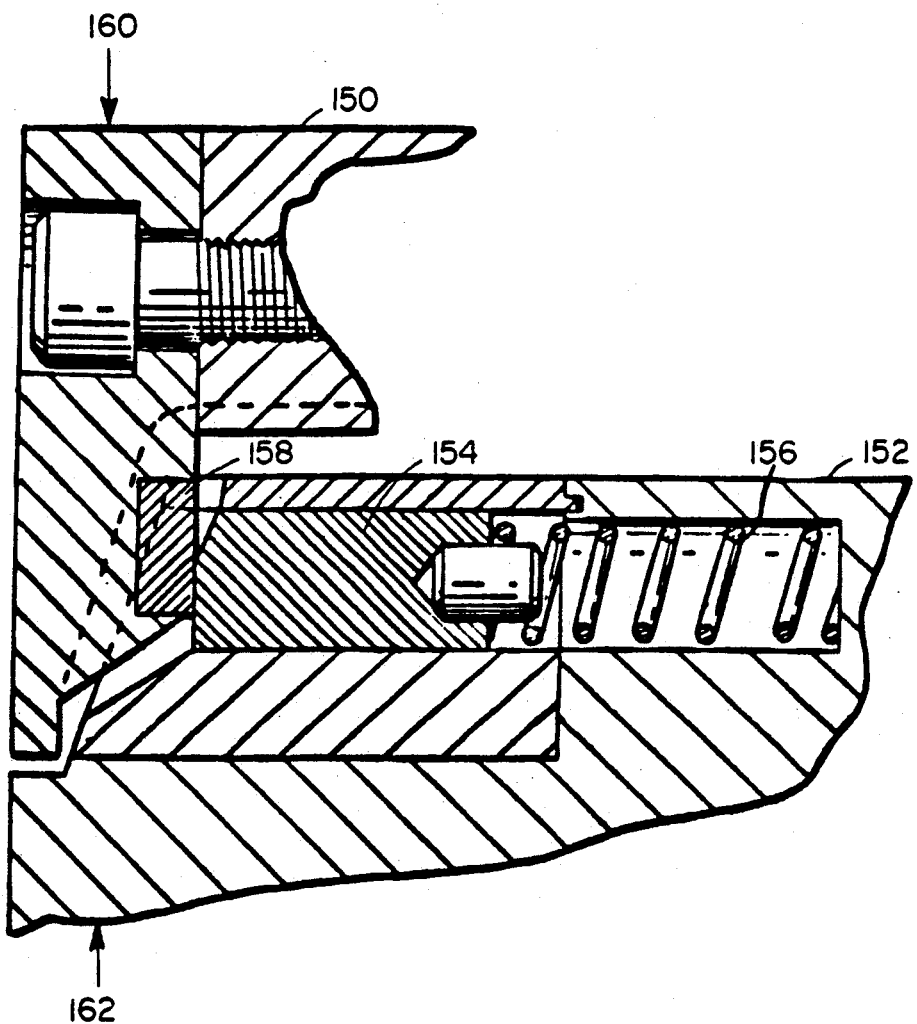
FIG. 6 is a partial cross-section of a pair of mold members of the prior art, shown near the end of a molding sequence.

FIG. 6 shows a prior art apparatus, disclosed in U.S Pat. No. 4,446,088, used to form latches in shape-molded thermoformed structures, such as egg cartons. The apparatus comprises a pair of mold members 150 and 152 each mold member having a key member 158 and 154, respectively, residing therein. As may be seen, key member 154 is permitted to move in a direction transverse to the direction of mold closure indicated by directional 160 and 62. To provide proper alignment of the key members during the shape-forming operation, key member 154 is outwardly biased by the force generated by spring 156. As can be appreciated, an apparatus of the type depicted in FIG. 6, because of the added complexity resulting from the employment of the spring-biased key member arrangement, can not offer the benefit to reduced operational downtime achieved by the present invention. The contents of U.S. Pat. No. 4,446,088 are hereby incorporated by reference in their entirety.

As indicated above, the key members described can be reversed in position. In other words, the key member carrying the bevelled face can be fixed in the top mold member and the key member carrying the cutting edge can be located in the bottom member, as demonstrated by the structure shown in FIG. 4. Moreover, the key member free to move in a direction transverse to the direction of mold closure can be positioned in the top mold member, as those skilled in the art will readily understand. As indicated, the hereinabove described mold arrangement of the present invention can be employed to form one or any number of orifices during a molding operation. Specific utility can be it employment in the formation of egg cartons, sandwich containers, vented containers, such as berry baskets, and the like. The thermoplastic material employed to form such molded structures can be any thermoplastic film or sheet of the foamed or unfoamed variety.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

What is claimed is:

1. In a process for creating at least one orifice in a plastic structure during the shape molding thereof, comprising: placing moldable plastic between a pair of conformable mold members having a first mold member and a second mold member, closing the members to apply compression thereto, wherein during the molding, opposed male and female key members in the mold members pierce and form at least one orifice in the plastic; the improvement comprising:

(a) providing at least one male key member, carried by the first mold member, the male key member having on at least one side thereof a planar face terminating in either a cutting edge or a bevelled face;

(b) providing at least one female key member, carried by the second mold member, the female key member having a pair of spaced planar faces each terminating in either a cutting edge or a bevelled face; at least one of the key members being free to move transverse to the direction of mold member closure relative to the respective mold member carrying said at least one key member;

(c) registering the male and female key members through the free transverse movement of at least one of the key members relative to the respective mold member carrying said at least one key member so that a cutting edge of one key will be opposite to a bevelled face of the other key and closing the mold members so that initial contact will involve the cutting edge, the bevelled edge and the plastic therebetween; and (d) closing the mold members further so that the cutting edge will ride off the bevelled face, causing alignment of the planar faces with a shearing through the plastic as the male key member cooperates with the female key member forming the orifice.

2. The process of claim 1, wherein the male key member has a pair of oppositely disposed planar faces each terminating in a cutting edge and the planar faces of the female key member terminates in bevelled faces.

3. The process of claim 2, wherein the female key member is free to move within the second mold member.

4. The process of claim 2, wherein the male key member is free to move within the first mold member.

5. The process of claim 1, wherein the male key member has a pair of oppositely disposed planar faces, one of which terminates in a cutting edge and the other of which terminates in a bevelled face and one planar face of the female key member terminates in a bevelled face oppositely disposed to the cutting edge of the male key member and the other planar face of the female key member terminating in a cutting edge oppositely disposed to, the bevelled face of the male key member.

6. The process of claim 5, wherein the female key member is free to move within the second mold member.

7. The process of claim 5, wherein the male key member is free to move within the first mold member.

* * * * *